United States Patent

Rinaldi et al.

[11] Patent Number: 6,028,642
[45] Date of Patent: Feb. 22, 2000

[54] DIGITAL HORIZONTAL SYNCHRONIZATION PULSE PHASE DETECTOR CIRCUIT AND METHOD

[75] Inventors: Anonio Rinaldi, Maple; Edward G. Callway, Toronto, both of Canada

[73] Assignee: ATI Technologies, Inc., Thornhill, Canada

[21] Appl. No.: 09/088,559

[22] Filed: Jun. 2, 1998

[51] Int. Cl.[7] .................................................. H04N 5/10
[52] U.S. Cl. ............................................ 348/540; 348/531
[58] Field of Search .................................. 348/540, 541, 348/546, 531, 194, 511, 682, 691, 695; 331/20; 315/391, 364, 370, 371; H04N 5/10

[56] References Cited

U.S. PATENT DOCUMENTS

| | | | |
|---|---|---|---|
| 4,488,170 | 12/1984 | Nillesen | 348/540 |
| 4,672,449 | 6/1987 | Kraus et al. | 348/540 |
| 4,739,403 | 4/1988 | Mark | 348/511 |
| 5,027,058 | 6/1991 | Kleck et al. | 348/194 |
| 5,296,928 | 3/1994 | Yamashita et al. | 348/531 |

FOREIGN PATENT DOCUMENTS 406030296 2/1994 Japan ............................ H04N 5/10

OTHER PUBLICATIONS

Television Engineering Handbook, by K. Blair Benson (1986) pp. 13.163–13.166.

*Primary Examiner*—Victor R. Kostak
*Attorney, Agent, or Firm*—Markison & Reckamp, P.C.

[57] ABSTRACT

A horizontal phase detection circuit and system detects the phase of the horizontal synchronization pulse for a horizontal synchronization phase lock loop using positive and negative fractional error compensation. The positive and negative fractional errors are determined to get a more accurate detection of where a horizontal synchronization pulse crosses a synchronization signal slice level. Using both positive and negative fractional compensation, the circuit and method detects the horizontal synchronization pulse width and center of the pulse. In addition, if desired, an adaptive slice level generator generates a variable slice level threshold based on a signal strength of the input video signal to facilitate improved detection in the cases where the video information is weak even after gain control has been applied.

18 Claims, 10 Drawing Sheets

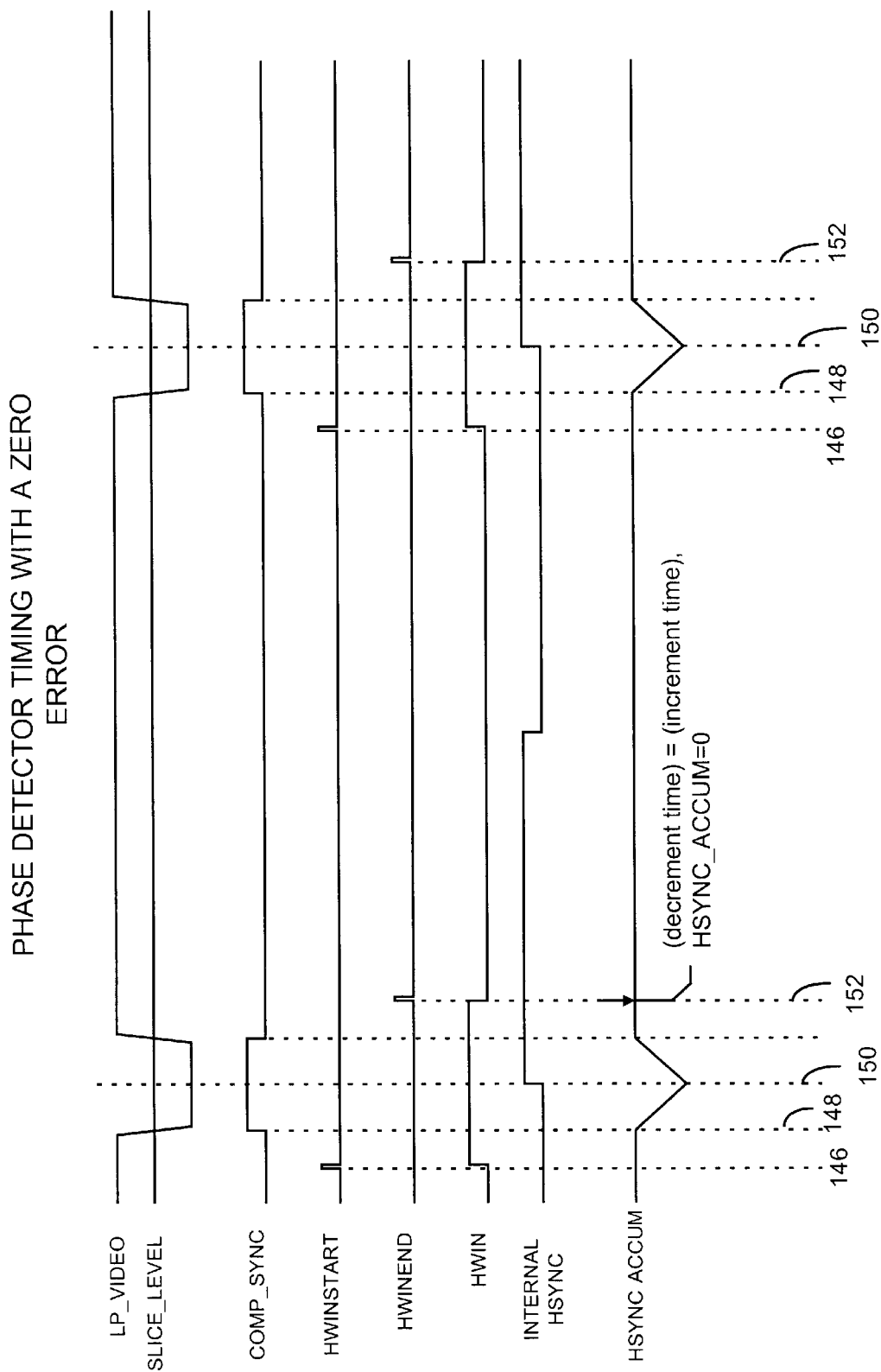

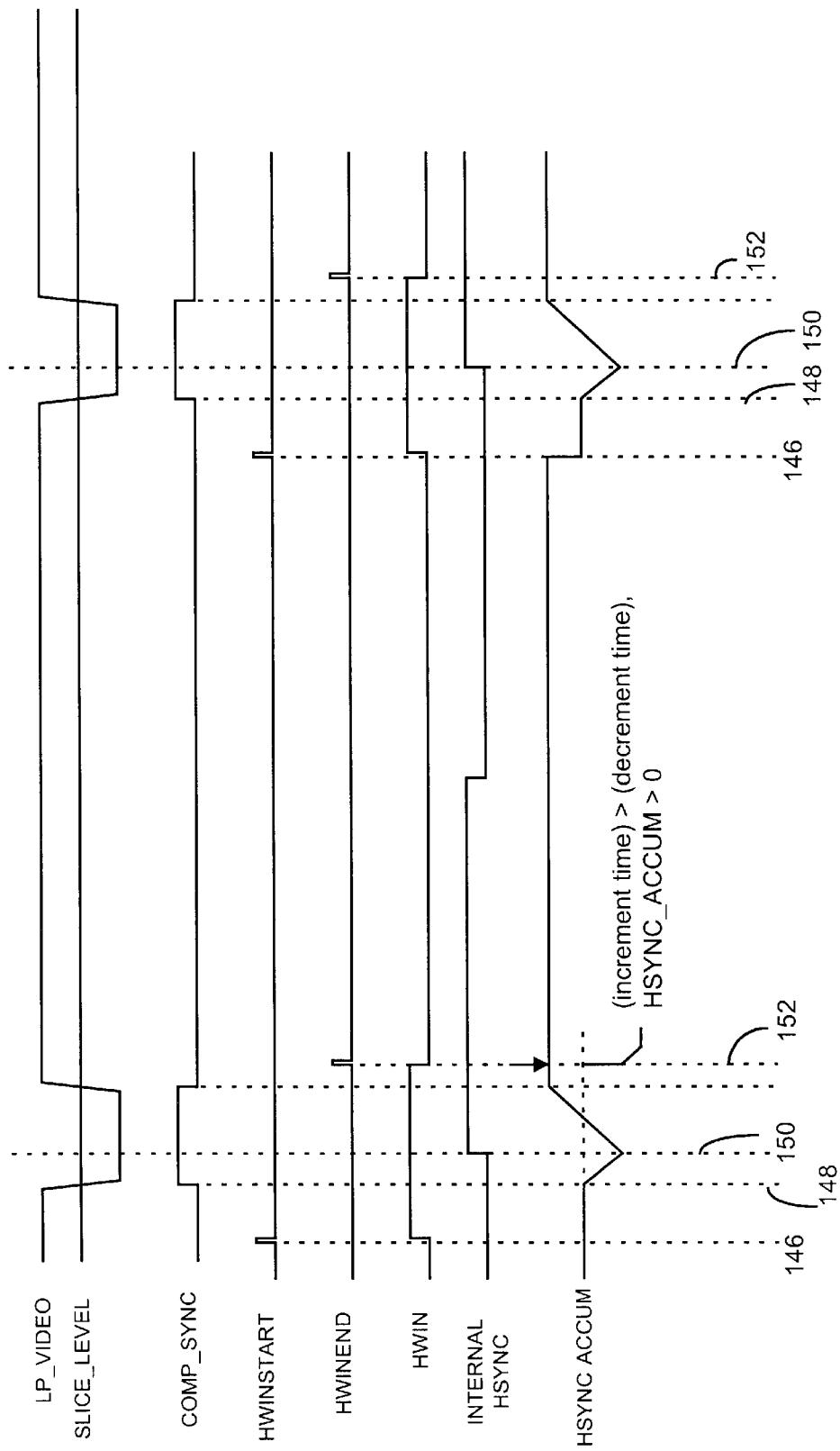

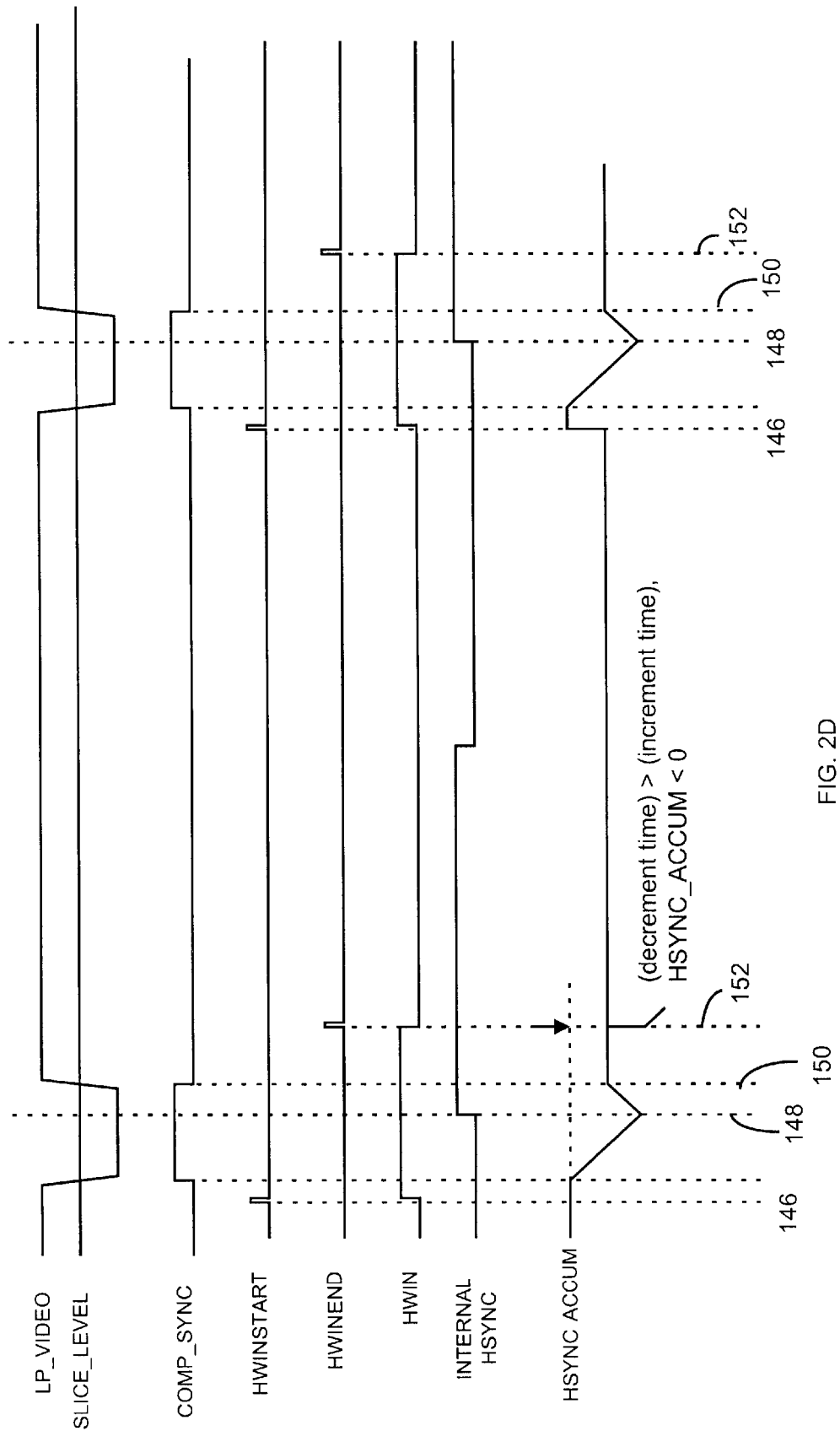

DIGITAL HORIZONTAL SYNCHRONIZATION PULSE PHASE DETECTOR CIRCUIT AND METHOD

FIELD OF THE INVENTION

The invention relates generally to circuits and methods for facilitating detection of a horizontal synchronization signal within a video signal, and more particularly to horizontal phase detector circuits for horizontal synchronization phase locked loops.

BACKGROUND OF THE INVENTION

To properly display video on a television screen or computer screen, synchronization must be made with horizontal and vertical synchronization signal data within a video signal. This facilitates horizontal and the vertical positioning for display monitors and television screens so that the system can identify which data needs to be put into a frame buffer for a particular line and at what particular time. With composite video input, the horizontal synchronization data, vertical synchronization data, blanking data and video data is typically included in one analog signal and there is a need to separate out this information. Where the analog video signal is noisy, horizontal synchronization data may include noise causing visual jitters to appear on a display screen if not properly filtered out.

One method for filtering out the noise in analog horizontal synchronization information includes detecting a rising edge and falling edge of a horizontal synchronization pulse. However, such systems typically still allow jitter to occur since filtering may be inadequate so that multiple detections can occur where the analog video signal is very noisy. With such systems, it can be difficult to determine exactly when a horizontal synchronization pulse begins.

Other systems, such as analog television decoders typically measure the width of a horizontal synchronization pulse and attempt to determine a center of the pulse to obtain an accurate start and end of the synchronization pulse using a voltage controlled oscillator as known in the art. However, such analog systems may be unnecessarily costly for digital applications. Digital video chips are typically designed to be small and inexpensive and also operate at high speeds to provide high quality synchronization to facilitate enhanced graphic capability. For example, where analog video from a VCR or camera is input to a computer, a video decoder may convert the analog video to a Y, U, V chroma and luminance data stream for display on the computer monitor, while also encoding the Y, U, V information for output to a television screen. Such chips typically must be accurate and cost competitive.

Another method for detecting horizontal synchronization information includes determining only one fractional component of a detected horizontal synchronization edge in the instances where the actual edge occurs between clock cycles. However, with such single edge fractional compensation, a horizontal synchronization signal phase lock loop may lock on a wrong edge which can cause a visually detectable image shift. Hence single edge fractional compensation may not provide adequate synchronization for high quality display applications.

Also, where the analog video signal is weak, horizontal synchronization detection circuits may not detect small levels of video input even after amplification from automatic gain control circuitry since slice threshold levels are typically static. Failure to detect the horizontal synchronization signal can result in loss of video display data.

Consequently, there exists a need for a digital horizontal synchronization pulse phase detection circuit and method that provides suitable horizontal phase detection for a horizontal synchronization phase lock loop to enhance display quality of video information.

BRIEF DESCRIPTION OF THE DRAWINGS

FIG. 2B is a timing diagram illustrating the operation of the phase detector in accordance with one embodiment of the invention.

FIG. 2C is a timing diagram illustrating the operation of the phase detector in accordance with one embodiment of the invention.

FIG. 2D is a timing diagram illustrating the operation of the phase detector in accordance with one embodiment of the invention.

DETAILED DESCRIPTION OF A PREFERRED EMBODIMENT OF THE INVENTION

A horizontal phase detection circuit and system detects the phase of the horizontal synchronization pulse for a horizontal synchronization phase lock loop using positive and negative fractional error compensation. The positive and negative fractional errors are determined to get a more accurate detection of where a horizontal synchronization pulse crosses a synchronization signal slice level. Using both positive and negative fractional compensation, the circuit and method detects the horizontal synchronization pulse width and center of the pulse.

In addition, if desired, an adaptive slice level generator generates a variable slice level threshold based on a signal strength of the input video signal or horizontal synchronization signal to facilitate improved detection even in the cases where the video information is a weak signal even after gain control has been applied. The adaptive slice level generator analyzes a level of a horizontal synchronization pulse tip and black level data to continually set new variable slice level thresholds on a line by line basis. As such, the slice level varies to ensure that a negative and positive edge of a incoming horizontal synchronization signal is detected for each line of received video.

Figure 1:
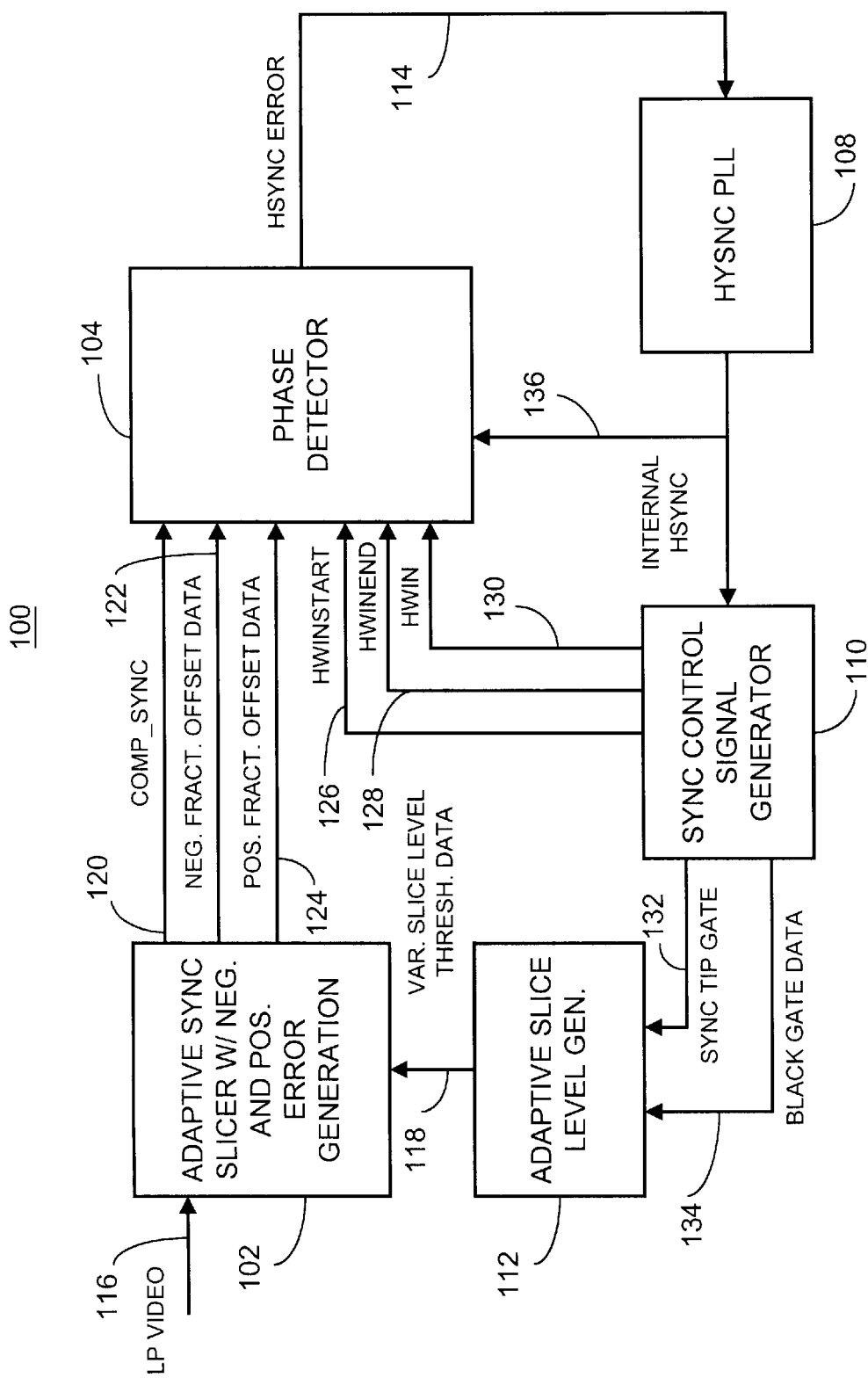
FIG. 1 is a block diagram illustrating one embodiment of a horizontal phase detector circuit and horizontal synchronization pulse phase lock loop with positive and negative fractional error compensation in accordance with one aspect of the invention.

FIG. 1 shows a horizontal synchronization (HSYNC) phase lock loop circuit 100 having an adaptive synchronization slicer 102 with positive and negative fractional offset error compensation, and a phase detector 104 coupled to a horizontal synchronization phase lock loop circuit 108. The horizontal synchronization phase lock loop circuit 100 also includes a synchronization control signal generator 110 and an adaptive slice level generator 112. As known in the art, the horizontal SYNC phase lock loop circuit 108 receives horizontal synchronization pulse error data 114 as detected by phase detector 104, and uses the error data to generate an error compensated output signal.

The adaptive synchronization slicer 102 receives a low pass filtered video signal 116 (LP video), which may be for example analog video data that has been passed through a low pass filter and digitized as known in the art. The LP video signal 116 includes both vertical synchronization and horizontal synchronization data, known as composite synchronization data. The adaptive synchronization slicer 102 also receives variable slice level threshold data 118 from the adaptive slice level generator 112. The adaptive synchronization slicer 102 generates composite synchronization data 120 (COMP_SYNC) which in effect is that portion of the filtered LP video signal corresponding to the digital horizontal synchronization pulse that exceeds the variable slice threshold level data. This is determined by a suitable comparator circuit in the adaptive synchronization slicer 102. The video information is typically sampled once a clock cycle such that the COMP_SYNC data 120 may indicate that a transition occurred at the beginning of a clock cycle although an actual transition may have occurred during the clock cycle. The adaptive synchronization slicer 102 also generates negative fractional offset data 122 and positive fractional offset data 124 to indicate the offset from the clock when the actual negative and positive transitions occur during a clock pulse.

The phase detector 104 evaluates the negative fractional offset data 122, positive fractional offset data 124, and the composite synchronization information 120 to determine the amount of error between clock cycles with respect to when the actual edges of an actual horizontal SYNC pulse occurred. As shown, the phase detector 104 also receives horizontal window start data (HWINSTART) 126, horizontal window end of data 128 and horizontal window data 130 control data from the synchronization control data generator 110. This control data is used to allow the phase detector 104 to discriminate against false horizontal synchronization pulses on a line by line basis. For example, the HWINSTART data 126 is a pulse indicating when to start looking for a digital horizontal synchronization pulse in the COMP_SYNC data 120. Similarly, the horizontal window end data 128 is a pulse indicating when to stop looking for the end of a digital horizontal synchronization pulse in the COMP_SYNC data 120. The horizontal window data 130 represents the duration of time of when to sample for the horizontal synchronization data.

In operation, the phase detector circuit 104 attempts to center a rising edge of an internal horizontal synchronization signal 136 with the center of the digital horizontal synchronization data detected from the composite synchronization data. The phase detector 104 may be any suitable logic or programmed digital signal processor. The phase detector circuit 104 determines the amount of error between the time a rising edge of the internal horizontal synchronization data 136 occurs and the time when the center of the received horizontal synchronization data occurs. In addition the phase detector circuit 104 uses the positive and negative fractional offset data 122 and 124 to fine tune the error determination by accounting for the time error resultant from a negative and positive transition of a received horizontal synchronization pulse occurring during the data sample clock pulse. The horizontal synchronization phase error data 114 represents the phase difference between an internal horizontal synchronization pulse and the received digital horizontal synchronization data detected from the composite synchronization data.

The synchronization generator 110, in addition to generating the horizontal window start data 126, horizontal window end data 128 and horizontal window data 130, also generates synchronization tip gate data 132 and black gate data 134 for the adaptive slice generator 112. The synchronization generator 110 may be any suitable logic or programmed digital signal processor. As known in the art, a synchronization tip gate signal or data may be a pulse indicating when a horizontal SYNC pulse has been determined to be present, such as a center of the pulse. Similarly, black gate data 134 may be a pulse or data indicating when a black level is present, for example, during the back porch portion of a video signal.

The adaptive slice level generator 112 selects a synchronization slice level for each line by continually comparing the black gate (level) data 134 with the synchronization tip gate data 132 according to the following formula:

$$SliceLevel = \frac{BlackGateLevel + SyncTipLevel}{2}$$

The adaptive slice level generator 112 outputs the variable slice level data 118 which varies in response to changes in the digital horizontal synchronization pulse 116 such that as the digital horizontal synchronization pulse has a lower value, the slice level is correspondingly reduced so that the suitable portion of the horizontal pulse is sliced or selected as the threshold to allow detection of the pulse.

The horizontal SYNC PLL 108 may be any suitable phase lock loop circuit as known in the art, and generates a phased corrected internal horizontal synchronization pulse 136 for the phase detector 104 and SYNC generator 110. As known in the art, the horizontal SYNC PLL 108 uses the feedback horizontal error data 114 to generate the phase compensated internal horizontal synchronization signal 136.

Figure 2A:
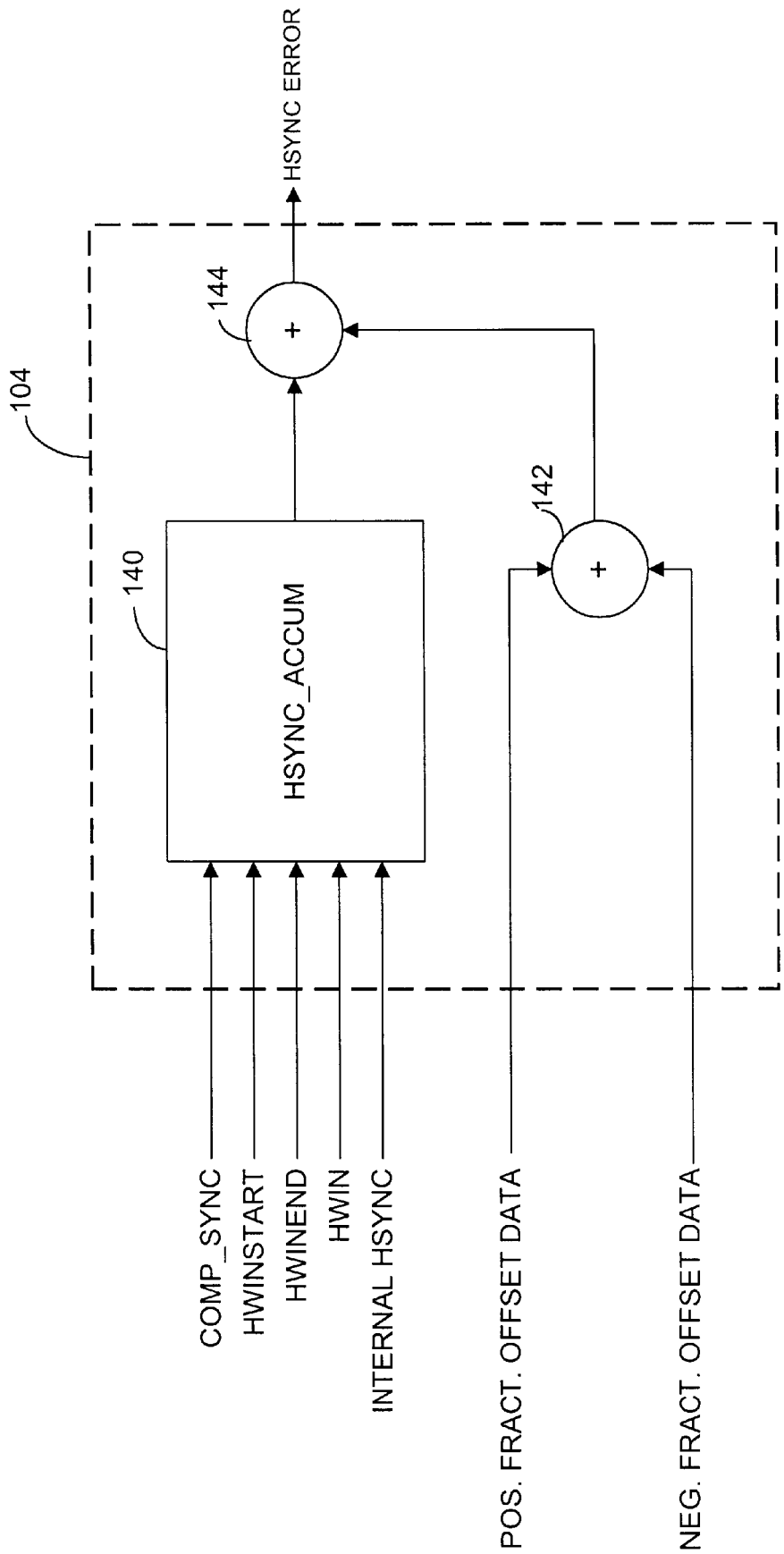
FIG. 2A is a block diagram illustrating one example of a phase detector in accordance with the invention.

Referring to FIGS. 2A–2D, FIG. 2A shows one example of the phase detector 104 implemented having a horizontal synchronization accumulator circuit 140 that generates an HSYNC_ACCUM signal as shown in FIGS. 2B–2D. A summing circuit 142 sums the positive and negative fractional offset data. Another summing circuit 144 combines the resultant net fractional offset with the HSYNC_ACCUM data to obtain the HSYNC ERROR data.

Referring to FIG. 2A, phase detector timing is shown with a resulting zero error. As shown by numeral 146, HWINSTART is used at the start of a new line to reset the accumulator 140. As shown by reference numeral 148, only when COMP_SYNC equals one, HWIN data equals one and INTERNAL SYNC data is zero does the accumulator circuit 140 decrement by one. As shown by reference numeral 150, only when COMP_SYNC equals one, HWIN equals one and INTERNAL SYNC is one does the accumulator increment by one. The HWINEND data is used to latch and hold the content of the accumulator for one line, as shown by reference numeral 152. FIGS. 2C and 2D illustrate timing for the phase detector when positive and negative error occurs.

Figure 3:
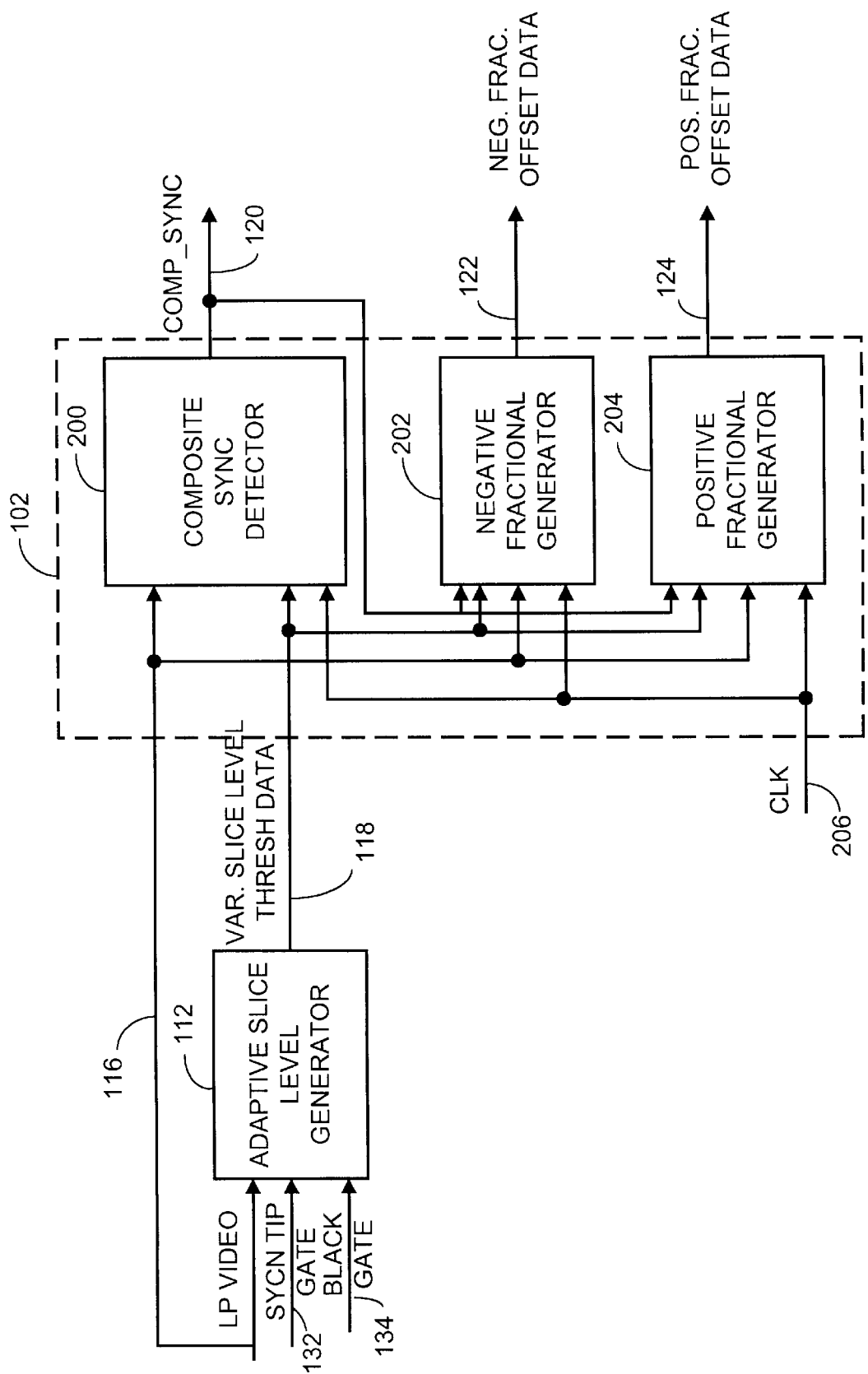
FIG. 3 is a block diagram showing an embodiment of an adaptive synchronization slicer and adaptive slice level generator to facilitate suitable horizontal synchronization phase detection in accordance with one aspect of the invention.
Figure 4:
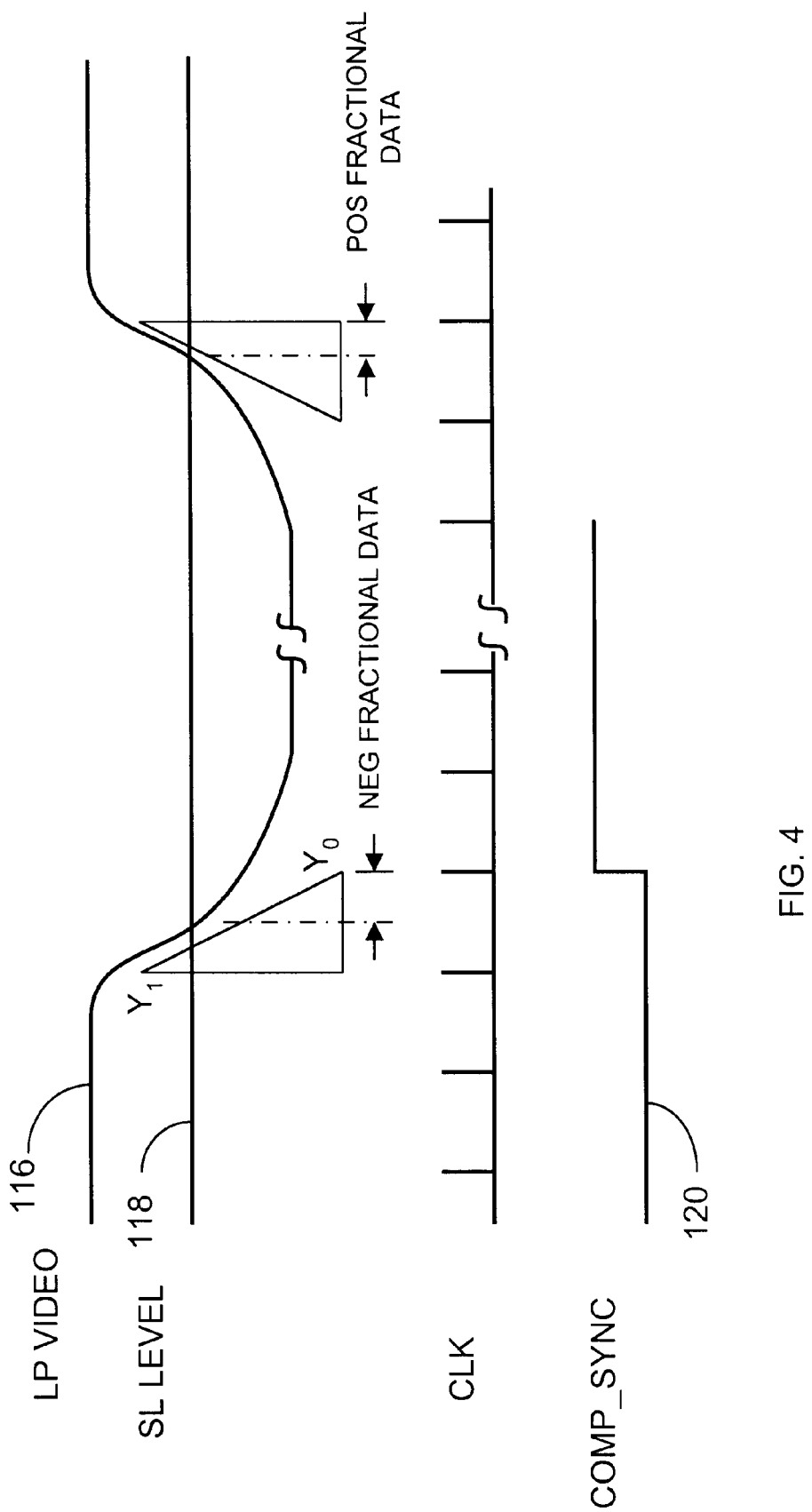
FIG. 4 is a timing diagram illustrating detected negative and positive fractional data based on low pass filtered input video information in accordance with one aspect of the invention.

Referring to FIGS. 3 and 4, the adaptive SYNC slicer 102 with positive and negative fractional offset error compensation includes a composite synchronization detector 200, a negative fractional offset generator 202 and a positive fractional offset data generator 204. The clock signal 206 serves as the timing data for the operation of the adaptive synchronization slicer 102. The composite synchronization detector 200 may be any suitable comparator circuit that compares the received horizontal synchronization data to the slice level based on the clock information to separate the horizontal synchronization information (and vertical synchronization data if desired) from the filtered video data to generate the composite synchronization data 120.

The negative fractional offset data generator 202 receives the digital horizontal synchronization pulse 116 in addition to the variable slice level threshold data 118 and the composite synchronization data 120. As shown in FIG. 4 the negative fractional offset data generator 202 determines the negative fractional data by triangulating, based on the input information, to determine an actual time between clock pulses that the falling edge of the received HSYNC pulse occurred. For example, the negative fractional data may be calculated according to the following formula:

$$Neg.FractionalOffsetData = \frac{SL - Y_0}{Y_1 - Y_0}$$

where SL is the variable slice level and $Y_0$ and $Y_1$ are points used to triangulate the offset as shown for example in FIG. 4.

Similarly, the positive fractional offset data generator circuit 204 determines the positive fractional offset data based on the digital horizontal synchronization pulse, the variable slice level threshold, the composite SYNC pulse and the clock information to determine the amount of error between the actual crossing of the digital horizontal synchronization pulse with the slice level so that the phase lock loop can be suitably programmed to account for the offset caused by the transition between the clock cycles. For example, the positive fractional offset data generator circuit 204 may determine the positive fractional offset data according to the following formula:

$$Pos.FractionalOffsetData = \frac{Y_0 - SL}{Y_0 - Y_1}$$

The $Y_0$ AND $Y_1$ values may be different for the positive and negative fractional offset data determination, particularly if noise is present.

Figure 5:
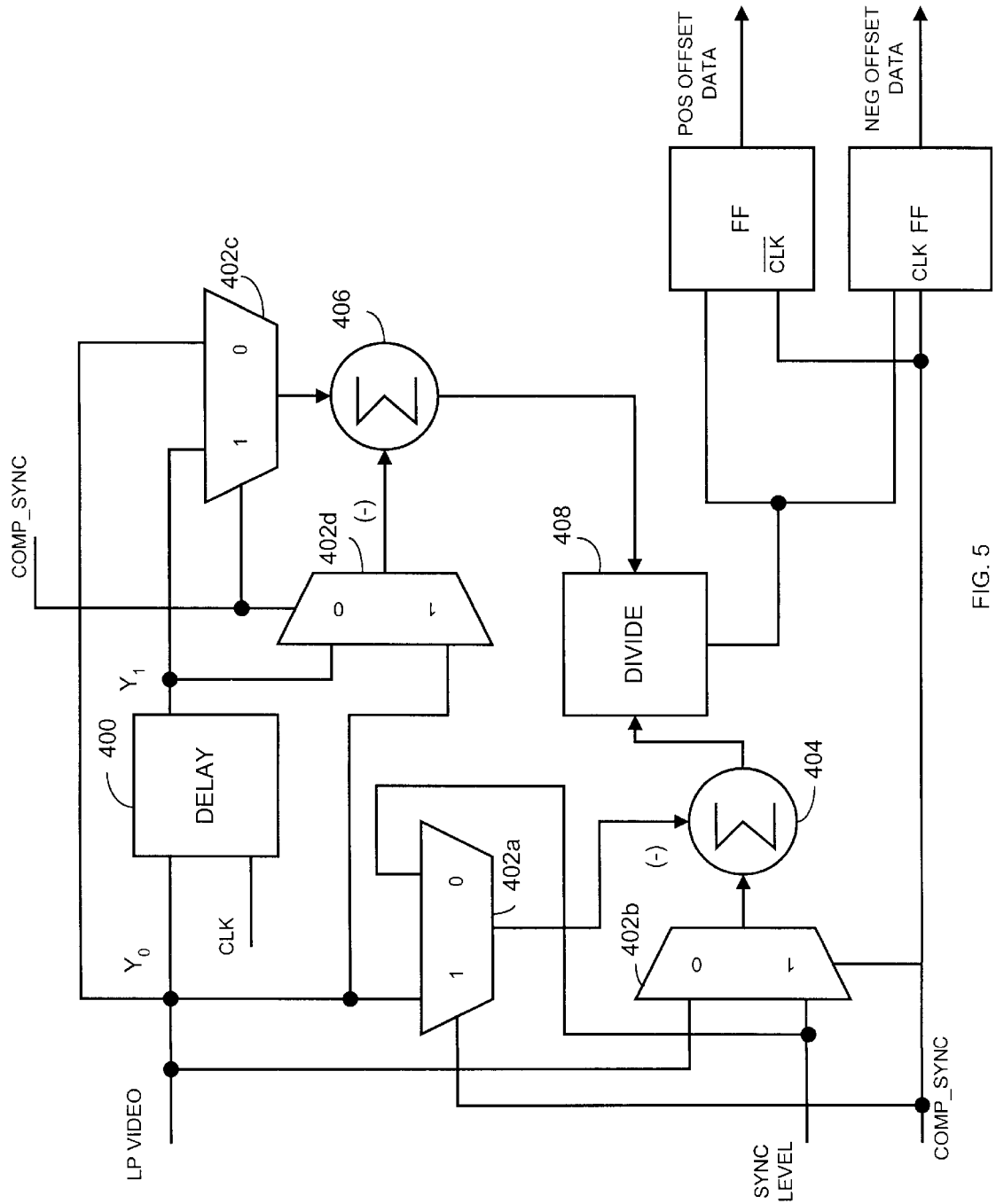
FIG. 5 is a block diagram of one embodiment of positive and negative fractional data generator circuits that use common hardware in accordance with one embodiment of the invention.

FIG. 5 illustrates one example of a configuration of the positive and negative fractional offset data generator circuits using common hardware components. As shown, a delay stage 400, such as a flip-flop, delays the data by one clock to obtain previous LP video data. A series of multiplexers 402a through 402d facilitate selection of data to allow proper summing of information through summers 404 and 406 which are coupled to a divider circuit 408 to facilitate the above mentioned calculations.

The positive and negative fractional offset data is based on the variable slice level threshold data since it varies as a function of the variable slice level threshold data as shown for example in FIG. 3. The adaptive slice level generator receives the digital horizontal synchronization pulse, the synchronization tip gate signal and the back gate signal to vary the variable slice level threshold data so that the slice is generated only during horizontal SYNC pulses and not during front porch or back porch signal portions.

Preferably, although not required, the negative fractional generator 202 detects a falling edge of the digital horizontal synchronization pulse. The positive fractional offset data detector circuit 204 detects a rising edge of the digital horizontal synchronization pulse.

Figure 6:
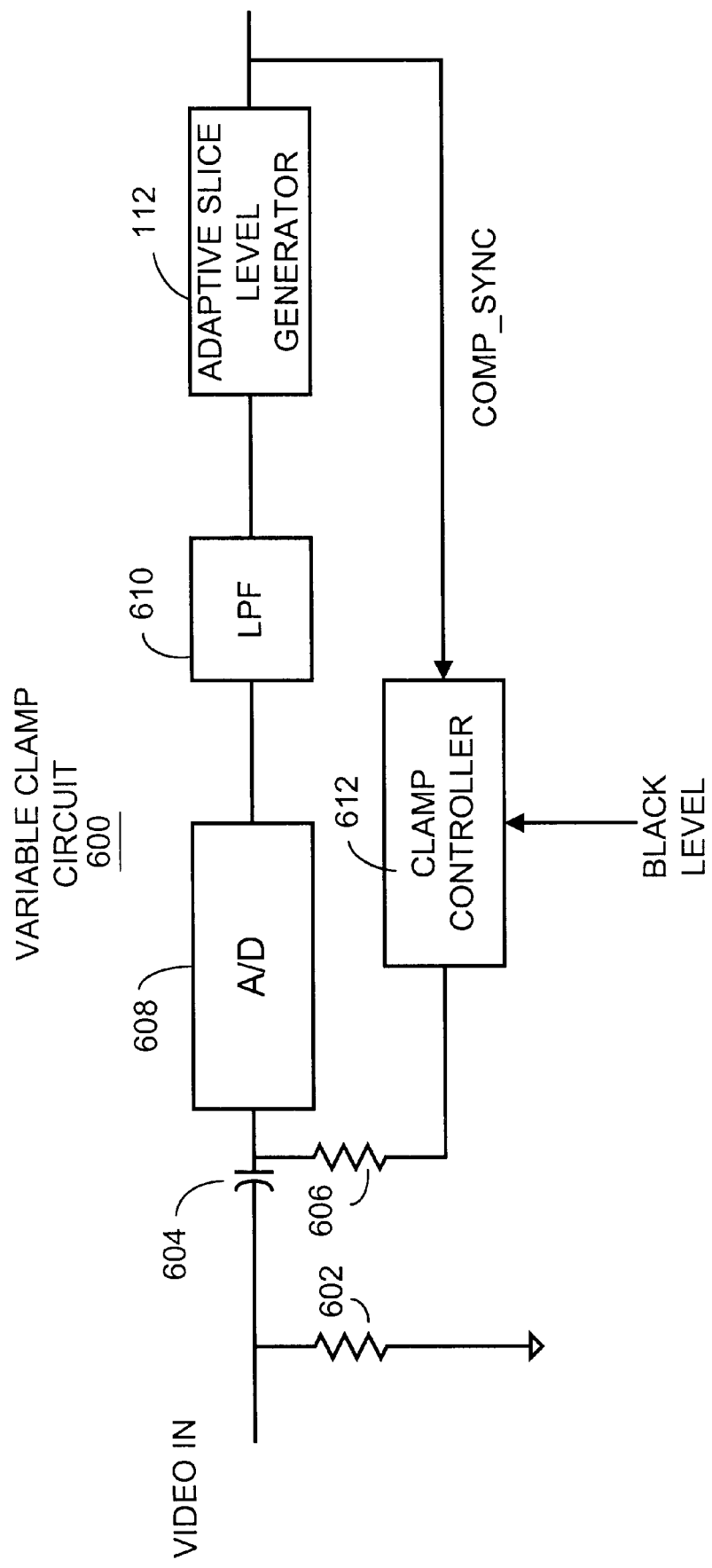
FIG. 6 is a block diagram of a variable clamp circuit in accordance with one embodiment of the invention.

FIG. 6 is an example of a variable clamp circuit 600 that varies a clamp level used to clamp the composite analog video input signal to a suitable level that allows detection of the synchronization pulse. The variable clamp circuit 600 includes an input resistor 602, and RC network having a capacitor 604 and resistor 606 coupled to an analog to digital converter 608. The digital output is passed through a low pass filter 610 to generate LP VIDEO. A clamp controller 612 receives COMP_SYNC data and black level data.

Figure 7:
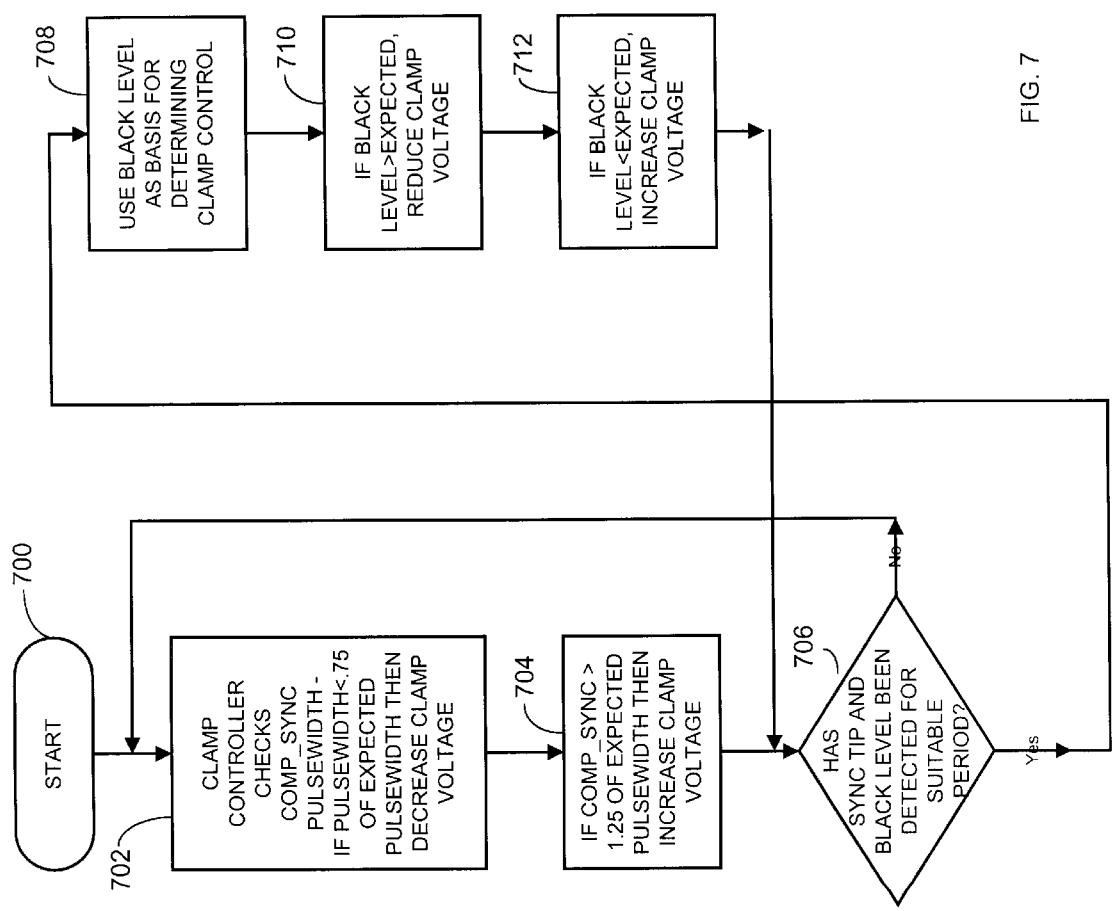
FIG. 7 is a flow chart illustrating one example of the operation of the variable clamp control circuit in accordance with one embodiment of the invention.

Referring to FIG. 7, in operation, the clamp controller controls during each HWINDOW active (per line basis) as shown in block 700. As shown in block 702, the variable clamp controller 612 determines the COMP_SYNC pulsewidth to determine if the pulsewidth is less that 75% of the expected pulsewidth. If the detected pulsewidth is less than 75% of the expected pulsewidth, the clamp controller decreases the clamp voltage at the input of the A/D to allow a decrease in input voltage prior to clamping occurring. If the COMP_SYNC pulsewidth is greater than 125% of the expected pulsewidth, then the clamp controller increases the clamp voltage at the input of the A/D converter to increase the clamp voltage. This is shown in block 704. As shown in block 706, the clamp controller determines if the sync tip level and black level has been detected for a suitable duration to maintain a continuous detection of the synchronization pulse. Once the synchronization pulse is detected for a predetermined number of lines, the black tip level is used as the basis for determining whether to vary the clamp level, as shown in block 708. If the black level is greater than the expected black level, the clamp level is reduced, as indicated in block 710. As shown in block 712, if the black level is less than an expected level, the controller increases the clamp level. The variable clamp controller attempts to insure that a horizontal synchronization pulse will not go undetected.

As seen from the diagrams and above discussion, the system operates to generate positive fractional offset data based on digital horizontal synchronization pulse information to facilitate positive fractional offset and negative fractional offset error compensation to more accurately detect the start of a horizontal synchronization pulse. This data is used to determine a phase of the horizontal synchronization pulse by phase detector 104 which determines a center of the horizontal synchronization pulse based on the positive and negative fractional offset data. Moreover, if desired, the system uses adaptive slice level generation to facilitate better detection of horizontal synchronization pulses on a line by line basis.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A digital horizontal synchronization pulse phase detector circuit comprising:
   a positive fractional offset data generator circuit responsive to a digital horizontal synchronization pulse to facilitate positive fractional offset error compensation;
   a negative fractional offset data generator circuit also responsive to the digital horizontal synchronization pulse to facilitate negative fractional offset error compensation; and
   a phase detector circuit, operatively coupled to the positive and negative fractional data generator circuits, configured to determine a center of the horizontal synchronization pulse based on positive and negative fractional offset data generated from the positive fractional offset data generator circuit and the negative fractional offset data generator circuit.

2. The digital horizontal synchronization pulse phase detector circuit of claim 1 including a composite horizontal synchronization (Hsync) detector circuit, also responsive to the digital horizontal synchronization pulse, operative to provide a composite synchronization signal for the negative and positive fractional offset data generator circuits.

3. The digital horizontal synchronization pulse phase detector of claim 1 fuirther including an adaptive slice level generator, operatively coupled to the positive fractional offset data generator circuit and the negative fractional offset data generator circuit, configured to output variable slice level threshold data that varies in response to changes in the digital horizontal synchronization pulse and wherein the positive and negative fractional offset data is based on the variable slice level threshold data.

4. The digital horizontal synchronization pulse phase detector of claim 3 wherein the adaptive slice level generator receives the digital horizontal synchronization pulse and is responsive to a synchronization tip gate signal and a black gate signal to vary the variable slice level threshold data.

5. The digital horizontal synchronization pulse phase detector of claim 1 wherein the negative fractional offset data generator detects a falling edge of the digital horizontal synchronization pulse and wherein the positive fractional offset data detector detects a rising edge of the digital horizontal synchronization pulse.

6. The digital horizontal synchronization pulse phase detector of claim 1 including a phase lock loop circuit, operatively responsive to the phase detector circuit, that generates a phase corrected horizontal synchronization pulse based on the negative and positive offset data.

7. The digital horizontal synchronization pulse phase detector of claim 3 wherein the adaptive slice level generator dynamically determines variable slice level threshold data on a line by line basis.

8. The digital horizontal synchronization pulse phase detector of claim 1 including a video input clamp control signal that controls clamping based on at least composite synchronization data.

9. A digital horizontal synchronization pulse phase detector circuit comprising:
   a positive fractional offset data generator circuit responsive to a digital horizontal synchronization pulse to facilitate positive fractional offset error compensation;
   a negative fractional offset data generator circuit also responsive to the digital horizontal synchronization pulse to facilitate negative fractional offset error compensation;
   at least one composite horizontal synchronization detector circuit, also responsive to the digital horizontal synchronization pulse, operative to provide a composite synchronization signal for the negative and positive fractional offset data generator circuits;
   an adaptive slice level generator, operatively coupled to the positive fractional offset data generator circuit and the negative fractional offset data generator circuit, configured to output variable slice level threshold data that varies in response to changes in the digital horizontal synchronization pulse and wherein the positive and negative fractional offset data is based on the variable slice level threshold data; and
   a phase detector circuit, operatively coupled to the positive and negative fractional data generator circuits, configured to determine a center of the horizontal synchronization pulse based on positive and negative fractional offset data generated from the positive fractional offset data generator circuit and the negative fractional offset data generator circuit.

10. The digital horizontal synchronization pulse phase detector of claim 9 wherein the adaptive slice level generator receives the digital horizontal synchronization pulse and is responsive to a synchronization tip gate signal and a black gate signal to vary the variable slice level threshold data.

11. The digital horizontal synchronization pulse phase detector of claim 9 wherein the negative fractional offset data generator detects a falling edge of the digital horizontal synchronization pulse and wherein the positive fractional offset data detector detects a rising edge of the digital horizontal synchronization pulse.

12. The digital horizontal synchronization pulse phase detector of claim 9 including a phase lock loop circuit, operatively responsive to the phase detector circuit, that generates a phase corrected horizontal synchronization pulse based on the negative and positive offset data.

13. A digital horizontal synchronization pulse phase detection method comprising:
   generating positive fractional offset data based on a digital horizontal synchronization pulse to facilitate positive fractional offset error compensation;
   generating negative fractional offset data based on the digital horizontal synchronization pulse to facilitate negative fractional offset error compensation; and
   determining a phase of the horizontal synchronization pulse by determining a center of the horizontal synchronization pulse based on at least the positive and negative fractional offset data.

14. The digital horizontal synchronization pulse phase detection method of claim 13 including the step of providing a composite synchronization signal for negative and positive fractional offset data generator circuits.

15. The digital horizontal synchronization pulse phase detection method of claim 13 further including generating variable slice level threshold data that varies in response to changes in the digital horizontal synchronization pulse and wherein the positive and negative fractional offset data is based on the variable slice level threshold data.

16. The digital horizontal synchronization pulse phase detection method of claim 15 wherein the generating the variable slice level threshold data is based on the digital horizontal synchronization pulse, a synchronization tip gate signal and a black gate signal to vary the variable slice level threshold data.

17. The digital horizontal synchronization pulse phase detection method of claim 13 wherein generating the negative fractional offset data includes detecting a falling edge of the digital horizontal synchronization pulse and wherein generating the positive fractional offset data includes detecting a rising edge of the digital horizontal synchronization pulse.

18. The digital horizontal synchronization pulse phase detection method of claim 13 including the step of generating a phase corrected horizontal synchronization pulse based on the negative and positive offset data.

* * * * *